United States Patent
Okamoto et al.

(10) Patent No.: US 6,771,893 B1
(45) Date of Patent: Aug. 3, 2004

(54) RECORDING APPARATUS AND REPRODUCING APPARATUS

(75) Inventors: Hiroo Okamoto, Yokohama (JP); Hideo Nishijima, Hitachinaka (JP); Nobuaki Maejima, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/399,086

(22) Filed: Sep. 20, 1999

(30) Foreign Application Priority Data

Jul. 12, 1999 (JP) .......................................... 11-197003

(51) Int. Cl.$^7$ ................................................ H04N 5/91
(52) U.S. Cl. ..................................... 386/124; 386/46
(58) Field of Search ..................... 386/108, 46, 124, 386/109, 111, 112, 27, 33, 95, 1, 40, 104, 105, 106, 125, 45, 123; H04N 5/91

(56) References Cited

U.S. PATENT DOCUMENTS 5,032,927 A * 7/1991 Watanabe et al.
5,377,051 A * 12/1994 Lane et al.
5,627,655 A * 5/1997 Okamoto et al. .............. 386/94
6,266,477 B1 * 7/2001 Ichinoi
2003/0091332 A1 * 5/2003 Higuchi et al. ................ 386/68

FOREIGN PATENT DOCUMENTS

EP  0 814 476 A2  12/1997
WO  WO 99/12332  3/1999

* cited by examiner

Primary Examiner—Robert Chevalier
(74) Attorney, Agent, or Firm—Antonelli, Terry, Stout & Kraus, LLP

(57) ABSTRACT

For achieving a recording apparatus and a reproducing apparatus enabling to function an interface of digital signals even when recording and reproducing analog signals, wherein the analog signal reproduced in an analog signal recording/reproducing circuit is converted into the digital signal in an encoder so as to be outputted from an interface circuit when reproducing the analog signal, while the digital signal inputted from the interface circuit is converted in a decoder into the analog signal to be recorded when recording the analog signal. Further, it comprises a digital signal recording/reproducing circuit for recording/reproducing a first digital signal into a recording medium, a converter for converting between the first digital signal and a second digital signal, and an interface circuit for inputting/outputting the second digital signal.

7 Claims, 13 Drawing Sheets

RECORDING APPARATUS AND REPRODUCING APPARATUS

BACKGROUND OF THE INVENTION

1. Field of the Invention

The present invention relates a recording apparatus and a reproducing apparatus for recording and reproducing a digital or analog signals, and in more particular to the recording apparatus and the reproducing apparatus for recording and reproducing video signals.

2. Description of Related Art

A recording apparatus and a reproducing apparatus for recording and reproducing digital signals encoded from analog signals, and further a recording apparatus and a reproducing apparatus, both equipped with recording and reproducing functions, are described, for example in Japanese Patent Laying-Open No. Hei 11-88835 (1999). Also, a recording and reproducing (recording/reproducing ) apparatus equipped with an interface for digital signal is described, for example in Japanese Patent Laying-Open No. Hei 10-79168 (1998).

However, the interface for digital signal is for the purpose of inputting and outputting the digital signals to be recorded and reproduced, but there is made no consideration about the use of the interface for the digital signal when recording and reproducing the analog signal.

Also, the interface of the digital signal is for inputting and outputting the digital signals to be recorded and reproduced in a format which is regulated according to a recording method on a recording medium, and no measure is taken for it to cope with the input and output of the digital signals being different in the format thereof, therefore there is of course a problem that such the signal cannot be recorded nor reproduced therewith. Further, in a case where the transmission rate of the digital signal is higher than the recordable maximum transmission rate, there is also a problem that it cannot be recorded.

SUMMARY OF THE INVENTION

An object of the present invention is to provide a recording apparatus and a reproducing apparatus being able to bring the interface for the digital signals functioning also in analog recording and reproducing.

Another object of the present invention is to provide a recording apparatus and a reproducing apparatus for the digital signal, being able to record and reproduce the digital signals in the formats other than that regulated with the recording method on the medium, or also the digital signal which is higher than the recordable maximum rate in the transmission rate thereof.

The first object mentioned above is achieved by a reproducing apparatus, comprising: a digital signal reproducing circuit for reproducing digital signal from a recording medium; an analog signal reproducing circuit for reproducing analog signal from said recording medium; an encoder for converting said analog signal into digital signal; an interface circuit for outputting said digital signal; and a switch for selectively inputting into said interface circuit switching between the digital signal converted in said encoder and the digital signal reproduced in said digital signal reproducing circuit, wherein, when reproducing in said analog signal reproducing circuit, the analog signal reproduced in said analog signal reproducing circuit is converted into digital signal in said encoder so as to be outputted from said interface circuit, and when reproducing in said digital signal reproducing circuit, the digital signal reproduced in said digital signal reproducing circuit is outputted from said interface circuit, and further by a recording apparatus, comprising: an interface circuit for inputting digital signal; a digital signal recording circuit for recording said digital signal onto a recording medium; a decoder for converting said digital signal into analog signal; and an analog signal recording circuit for recording the analog signal onto said recording medium, wherein, when recording in said an dialog signal recording circuit, the digital signal inputted from said interface circuit is converted in said decoder to be recorded in the analog, and when recording in said digital signal recording circuit, the digital signal inputted from said interface circuit is recorded.

The second object mentioned above is achieved by a reproducing apparatus, comprising: a digital signal reproducing circuit for reproducing a first digital signal from a recording medium; a converter for converting the first digital signal into a second digital signal; and an interface circuit for outputting said second digital signal which is converted in said converter, further by a recording apparatus, comprising: an interface circuit for inputting a second digital signal; a converter for converting said second digital signal into a first digital signal; and a digital signal recording circuit for recording said first digital signal which is converted in said converter on a recording medium.

BRIEF DESCRIPTION OF DRAWINGS

Those and other objects, features and advantages of the present invention will be become more readily apparent from the following detailed description when taken in conjunction with the accompanying drawings wherein.

DESCRIPTION OF THE PREFERRED EMBODIMENTS

Hereinafter, detailed explanation of the embodiments according to the present invention will be given by referring to the attached drawings.

Figure 1:
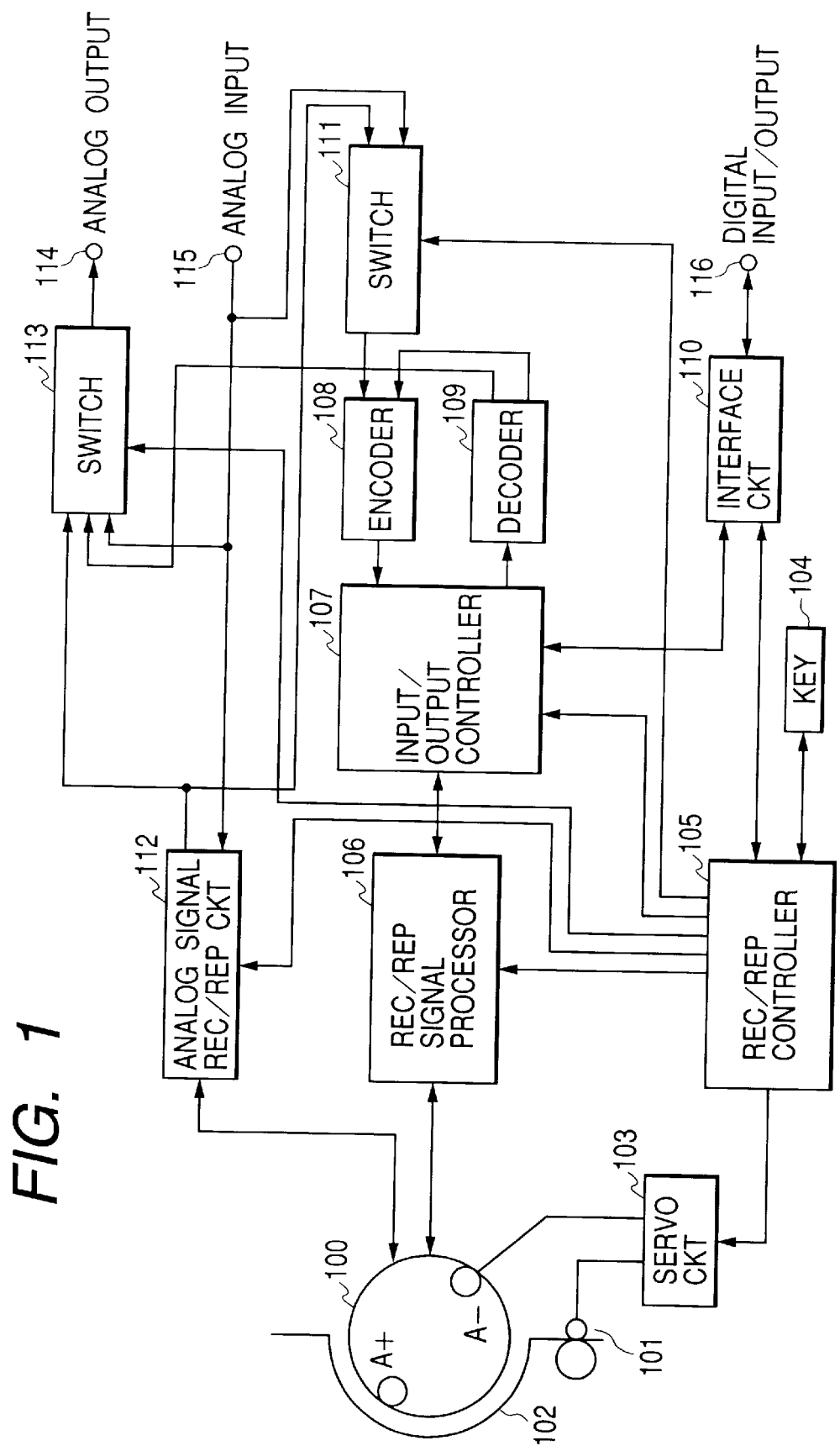
FIG. 1 is a block diagram of showing a recording/reproducing apparatus according to an embodiment of the present invention.

FIG. 1 shows the structure of a recording/reproducing apparatus according to an embodiment of the present invention. Though that shown in the FIG. 1 is the structure of the apparatus for common use in recording and reproducing, however it is almost similar the apparatus for recording only or for reproducing only. Also, an example shown in the FIG. 1 is of a tape recorder of rotating head type, however the present invention can also be applied to other recording/ reproducing apparatuses other than that, such as a disc recorder and so on, for example.

A reference numeral 100 indicates a rotary head, 101 a capstan, 102 a magnetic tape, 103 a servo circuit for controlling the rotary head and carrying velocity of the magnetic tape, 104 a key for operating the apparatus, provided on the recording/reproducing apparatus or in a remote control device thereof, 105 a recording/reproducing controller, such as a micro-processor, for example, for controlling modes of recording/reproducing, 106 a recording/reproducing signal processor for producing the record signal when recording and for demodulating the reproduced signal when reproducing, 107 an input/output controller, 108 an encoder for producing digital signals by encoding analog signals, 109 a decoder for producing analog signals by decoding digital signals, 110 an interface circuit for inputting/ outputting of the digital signals, 111 and 113 switches or selectors, 112 an analog signal recording/reproducing circuit for recording and/or reproducing of the analog signals. The analog signals, though not shown in the Figure, can be composed or made from an analog video signal and an analog audio signal, for example. Of course, they can be made from either one of them, or from a signal(s) other than those. Or, they may be made from received signals by an analog broadcast receiver circuit. For example, though not shown in the Figure, in a case where it has the analog broadcast receiver circuit therein, either one of the received signal by the analog broadcast receiver circuit and the signal which is inputted from an input terminal 115 may be inputted into the switch 111 and the analog signal recording/ reproducing circuit 112, by changing over them. The digital signals are, for example, the digital video and digital audio signals which are compressed in accordance with the MPEG2 method, however may be other than those, of course. Also, they may be digital received signals by a digital broadcast receiver circuit. For example, though not shown in the figure, in a case where it has the digital broadcast receiver circuit therein, either one of the received signal by the digital broadcast receiver circuit and the signal which is inputted from the interface circuit 110 may be inputted to the input/output controller 107, by changing over them.

When recording the digital signal, record data in a form of packet is inputted at an arbitrary time interval or distance from a digital input/output terminal 116. A part of the packet data inputted from the digital input/output terminal 116 is inputted into the recording/reproducing controller 105 through the interface circuit 110. In the recording/ reproducing controller 105, by means of the information which is attached to the packet data or transmitted separately therefrom, the kind and the maximum transmission rate and so on of the packet data are detected, thereby to decide the recording mode and to set the operation modes of the recording/reproducing signal processor 106 and the servo circuit 103, depending upon the detection result thereof. The interface circuit 110 detects the packet data to be recorded and outputs it through the input/output controller 107 into the recording/reproducing signal processor 106. Generating an error correction code, an ID information, a sub-code and so on, and also generating the record signal therein, the recording/reproducing signal processor 106 records them onto the magnetic tape 102 through the rotary head 100.

Also, by outputting the digital signal which is inputted from the input/output terminal 116 to the decoder 109 through the interface circuit 110, the signal decoded in the decoder 109 is inputted into the encode circuit 108, thereby inputting a re-encoded signal through the interface circuit 110 into the recording/reproducing controller 105 to be recorded, therefore it is possible to record the transmission rate of the digital signal by converting it. For example, even in a case where the transmission rate of the inputted digital signal is greater than the maximum transmission rate, it is possible to record it by re-encoding it so that the transmission rate comes to be less than the maximum transmission rate in this manner. Further, it is also possible, by re-encoding it so that the transmission rate comes to be smaller than that, to make possible the recording for a long time period.

When recording, the analog signal inputted from the analog input terminal 115 is inputted into the analog signal recording/reproducing circuit 112 and the switch 111. In a case when conducting the analog recording, the analog signal is treated by a predetermined process in the analog signal recording/reproducing circuit 112, and then is recorded on the magnetic tape 1102 by means of the rotary head 100. In this instance, though not shown in the figure, the servo circuit 106 is controlled upon the basis of a frame cycle of the analog video signal. While, in a case when conducting the digital recording, the analog signal which is inputted through the switch 111 is converted into the compressed digital signal in the encode circuit 108, so as to be outputted into the input/output controller 107. And, it is recorded in the same manner as of the recording of the digital signal. Further, the head for use in the analog recording/reproducing can be used in common as the head for the digital recording/reproducing, or they may be provided independently. In the FIG. 1, though only two (2)

heads are depicted on the rotary head 100, however four (4) or more of them are used when the heads may be provided independently.

In this manner, three kinds of recordings, i.e., the digital recording of the signal inputted in the form of the digital signal, the analog recording of the signal inputted in the form of the analog signal, and the digital recording of the signal inputted in the form of the analog signal are possible. However, it may be determined or set by the key or automatically, depending upon the kind of the magnetic tape, on which one of the recordings should be done.

Further, when recording the digital signal or the analog signal, or when waiting for or stopping the recording, it is possible to output the signal which is inputted from the other input/output terminal as a monitor signal. When inputting (i.e., recording) the digital signal, it is possible to output the digital signal which is inputted to the input/output control circuit 107, into the decoder 109, thereby to convert it into the analog signal in the decoder 109, and to output it though the switch 113 at the analog output terminal 114. When inputting (i.e., recording) the analog signal, by inputting the digital signal which is converted in the encoder 108 into the interface circuit 110 through the input/output controller 107, it is possible to output it at the digital input/output terminal 116. Also, by outputting this signal into the decoder 109 so as to convert it into the analog signal therein, it is possible to output it at the analog output terminal 114 through the switch 113. From this, when recording, waiting for or stopping the digital signal, it is possible to perform confirmation of the digital signal which is converted in the encoder 108, or comparison of the signals, by providing the output of the decoder 109 and the analog signal inputted from the analog input terminal 115 exchangably into the switch 113. In particular, in a case where the encode rate in the encoder 108 is variable, it is possible to confirm the difference in the encode rates with ease.

Further, in a case where the decoder 109 has an OSD function of multiplexing the information of such as a menu, etc., onto the picture, since this OSD function can be used also when recording, waiting for the recording, and stopping the recording, in the same manner as when reproducing, it is possible perform the same display. Alternatively, it is also possible to output the analog signal which is inputted at the analog output terminal 114 ordinarily, while converting the digital signal into the analog signal in the decoder 109 to be outputted at the analog output terminal 114 through the switch 113 only when the menu or the like is required to be displayed.

When reproducing, first of all, it is decided in which mode the recorded signal should be recorded, through detection of the ID information or the like in the recording/reproducing signal processor 106. In a case of reproduction of the signal recorded in digital form, the detection of synchronizing signal, as well as the detection and correction of errors are performed from the signal reproduced by the rotary head 100 in the recording/reproducing signal processor 106, and then the data and the sub-code and so on are reproduced therein, thereby to be outputted to the input/output controller 107. The input/output controller 107 outputs the digital signal being reproduced into the interface circuit 110, as well as into the decoder 109.

When reproducing the signal received in analog from, after being treated by a predetermined process in the analog signal recording/reproducing circuit 112, the analog signal reproduced by the rotary head 100 is outputted through the switch 113 from the analog output terminal 114. At the same time, in the encoder 108, the analog signal inputted through the switch 111 is converted into the compressed digital signal to be outputted into the input/output controller 107. Then, by inputting it into the interface circuit 110 through the input/output control circuit 107, it is possible to output it at the digital input/output terminal 116.

In this way, the signal which is reproduced in analog form and inputted in analog can be outputted as the digital signals by means of the interface circuit 110.

Next, explanation will be given on the record signal when being recorded in digital from.

Figure 2:
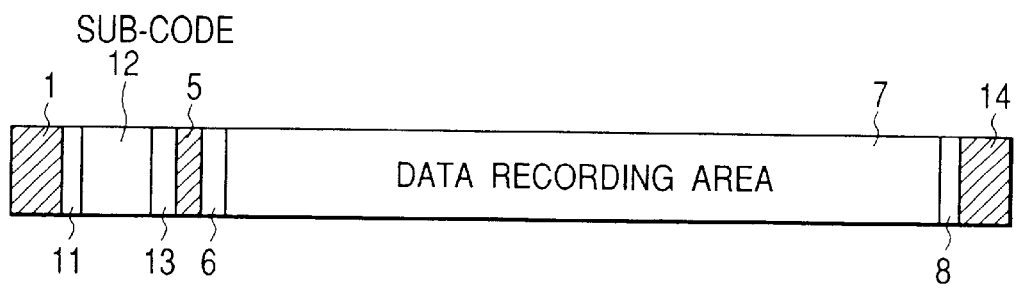
FIG. 2 is a view of showing a recording patter of one of tracks when recording digital signals.

FIG. 2 shows a recording pattern for one track when recording it in digital. A reference numeral 7 indicates a data recording area in which the compressed digital video signal is recorded, 12 a sub-code recording area in which sub-codes, such as time information, program information, etc., are recorded, 6 and 7 preambles of the respective recording areas, 8 and 13 post-ambles of the respective recording areas, 5 gaps between those recording areas, and 1 and 14 margins at track edges thereof. In this manner, with provision of the post-ambles and the pre-ambles in each of the recording areas and the gaps between them, it is possible to perform so-called an after-recording, independently in each of the areas.

FIG. 3(*a*) or 3(*b*) shows the block construction in each of the areas. FIG. 3(*a*) shows the block construction of the data recording area 7 shown in the FIG. 2. A reference numeral 20 indicates a synchronizing signal, 21 an ID information, 22 data, and 23 a first parity (CI parity) for the error detection and correction. For example, the synchronizing signal 20 is constructed with 2 bytes, the ID information with 3 bytes, the data with 99 bytes, the parity with 8 bytes, respectively, therefore, the one (1) block is constructed with 112 bytes, in total. FIG. 3(*b*) shows the block construction of the sub-code recording area 12 shown in the FIG. 2. In the blocks of the sub-code recording area 12, the synchronizing signal 20 and the ID information 21 are same to those as shown in the FIG. 3(*a*), while the data 22 is constructed with 19 bytes, the parity 23 with 4 bytes, accordingly the one (1) block is constructed with 28 bytes in total, i.e., being one-fourth (¼) of the block shown in the FIG. 3(*a*). In this manner, by bringing the byte numbers in the one block into the ratios of whole numbers (i.e., one-forth (¼)), and further making the constructions of the synchronizing signal 20 and the ID information 21 be same in the all areas thereof, it is possible to treat with a same circuit those processes, such as the generation of the blocks when recording, detection of the synchronizing signal and the ID information, etc.

Figure 3A:
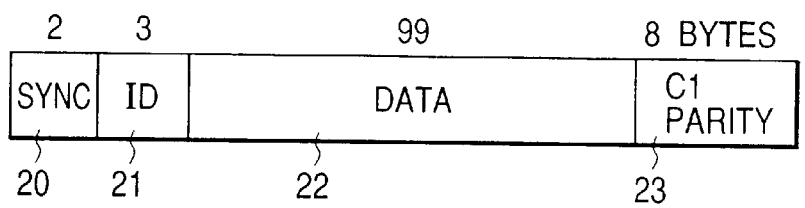
FIGS. 3(a) and (b) are views for showing each construction of blocks.
Figure 3B:
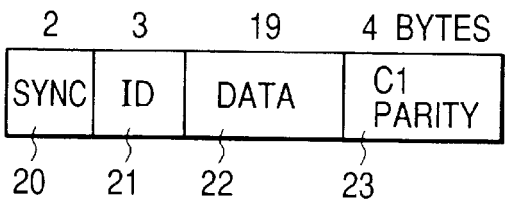
Figure 4:
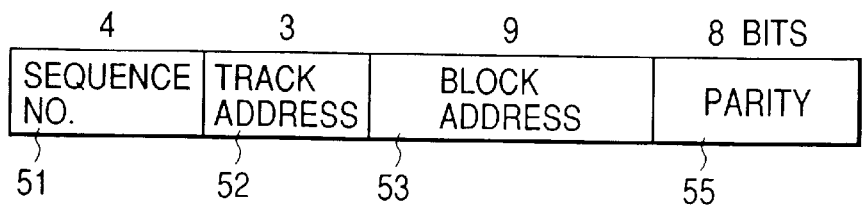
FIG. 4 is a view for showing a 1D information 21 in the FIGS. 3(a) and (b)

FIG. 4 shows the constructions of the ID information 21 shown in the FIGS. 3(*a*) and 3(*b*). A reference numeral 51 indicates a sequence number, 52 a track address, 53 a block address within one track, 55 a parity for detecting errors in the sequence number 51, the track address 52 and the block address 53. The block address 53 is that for discrimination the blocks in each of the recording areas. For example, in the data recording area 7, it is from 0 to 335, and in the sub-code recording area from 0 to 15. The tracking address 52 is that for discrimination the blocks, and by changing the address by a unit of one (1) track or two (2) tracks, i.e., determining it from 0 to 5 or from 0 to 2, for example, it is possible to discriminate the 6 tracks. The sequence number 51 is changed, for example, by a unit of 6 tracks to be discriminated in the track address 52, i.e., by determining it from 0 to 15, it is possible to discriminate the 96 tracks. If bringing the track address in synchronism with the cycle of a second error correction code which will be mentioned later, it is possible to discriminate between the process of when recording and the discrimination of when reproducing, with each other.

Figure 5:
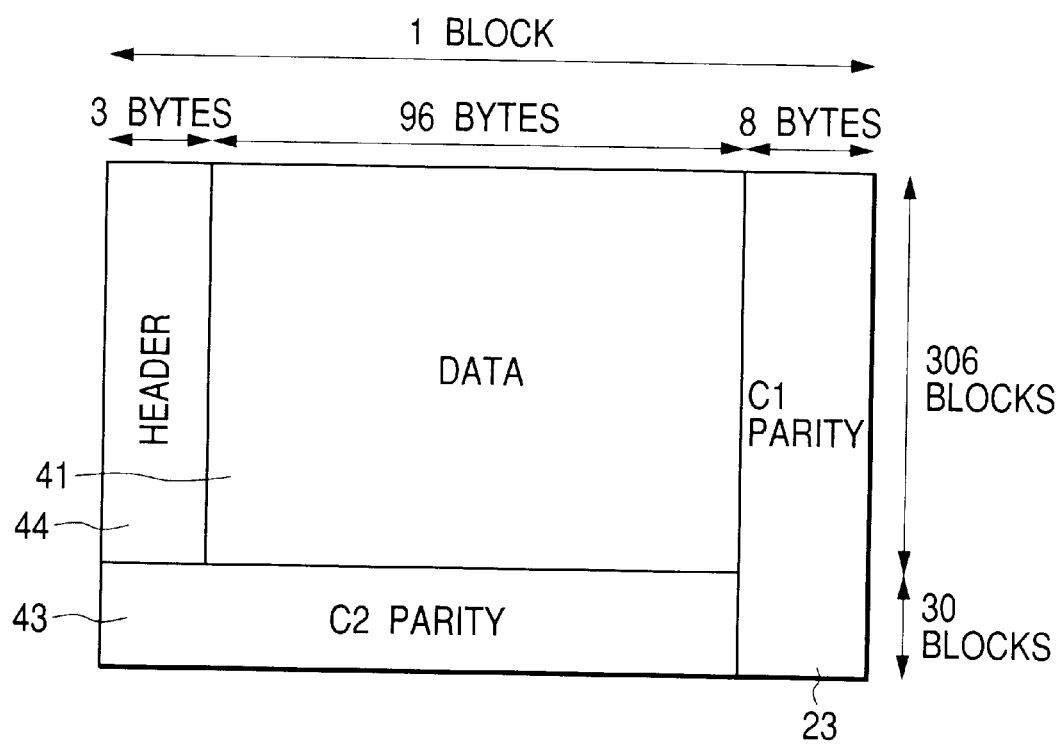
FIG. 5 is a view for showing the construction of data in each one track on a recording area 7 in the FIG. 2.

FIG. 5 shows the data construction of one (1) track in the data recording area 7 shown in the FIG. 2.

Although the synchronizing signal 20 and the ID information 21 shown the FIGS. 3(a) and 3(b) are necessary, however they are omitted here. The data recording area 7 is constructed with, for example, 336 blocks, wherein into the first 306 blocks is recorded the data 41 and into the next 30 blocks the second error correction code (i.e., a C2 parity 43).

The C2 parity 43 of 10 blocks is attached, for example, to each 102nd block of the data of 306 blocks×6 tracks, by dividing the block into 18 portions thereof. As the error correction code can be applied the Reed-Solomon code, for example.

Figure 6:
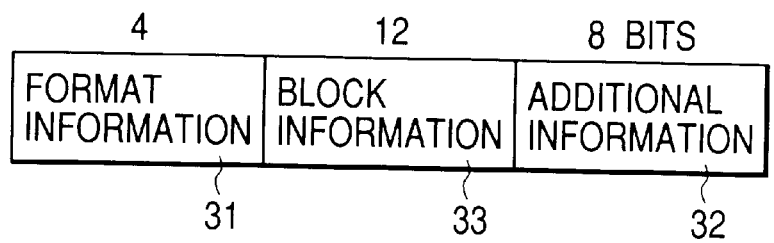
FIG. 6 shows the construction of a header 44 of the recording area 7 shown in the FIG. 5.

The 99 bytes data in each block is constructed with a header 44 of 3 bytes and the data 41 of 96 bytes. FIG. 6 shows the construction of the header 44 in the FIG. 5. The header 44 is contracted with a format information 31, an additional information 32 and a block information 33.

Figure 7:
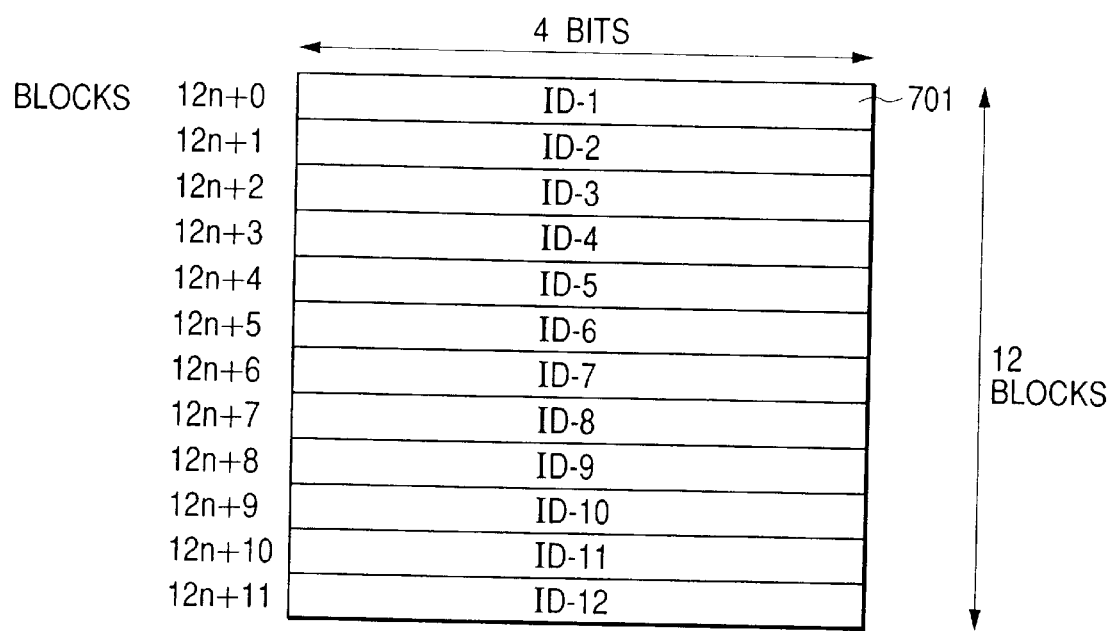
FIG. 7 shows the construction of the a format information shown in the FIG. 6.

FIG. 7 shows the construction of the format information 31 in the FIG. 6. The format information 31 is that relating to the recording format, wherein, for example, one information is constructed with 48 bits of 12 blocks (6 bytes). And, by recording this information by a plurality of times in multiplex manner, thereby achieving improvement in a detecting capability when reproducing. The data of 6 blocks is constructed with, for example, a size of one block, an existence of the additional information recording area, a number of the programs to be memorized, a rotation number of the rotary head, a method of the error correction code, and a format of the data to be recorded, etc.

The recording mode regulates the recording method. For example, 2 tracks are recorded (1 track by 1 scanning) by 1 revolution of the rotary head in a "mode 1", 2 tracks are recorded by 3 revolutions of the rotary head with reducing the carrying velocity of the magnetic tape one-third (⅓) in a "mode 3", 2 tracks are recorded by 5 revolutions of the rotary head with reducing the carrying velocity of the magnetic tape one-fifth (⅕) in a "mode 5", and 2 tracks are recorded by 7 revolutions of the rotary head with reducing the carrying velocity of the magnetic tape one-seventh (1/7) in a "mode 7". In a "mode n", though the recording rate comes to be 1/n, however the revolution number of the rotary head is not changed, therefore it is possible to obtain the long time recording of n-times longer. When recording, the recording/reproducing controller 105 discriminates the transmission rate of the recording data, so as to control the recording/reproducing signal processor 102 and the servo circuit 106, thereby setting the most suitable recording mode to record. And, it records the mode in which the recording is conducted into the format information 31.

In the format of the data to be recorded, for example, the packet length of the packet to be recorded is regulated. By controlling an amount of data to be recorded in each one track by a unit of the packet and recording the number of them being recorded, it is possible to cope with any transmission rate, arbitrarily. Further, the control may be conducted for each one of the tracks or for each plural tracks. Also, by recording the packet length, it is possible to cope with any length of the packet, arbitrarily.

When reproducing, by detecting that format information 31 to discriminate the recording mode and so on, it is sufficient to set the recording/reproducing signal processor 106 into that mode discriminated to reproduce.

Figure 8:
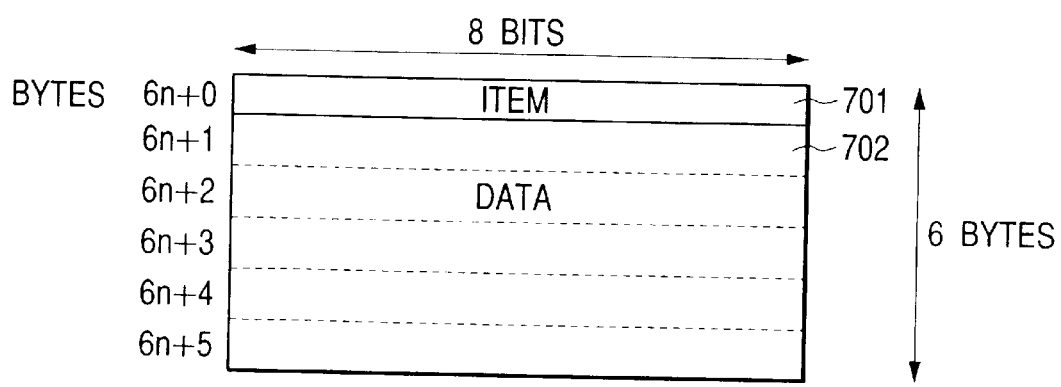
FIG. 8 shows the construction of an additional information 32 shown in the FIG. 6 and a sub-code data 22 shown in the FIG. 3(b)

FIG. 8 shows the constructions of the additional information 32 shown in the FIG. 6 and of the sub-code data 22 shown in the FIG. 3(b). In those additional information 32 and the sub-code data 22, each information of them being constructed with 6 bytes, for example, and wherein a first 1 byte is an item code 701 for indicating the kind of information and the remaining 5 bytes for data 705, thereby enabling to record various kinds of data. In the additional data or information 32 shown in FIG. 6, every 6 blocks forms or constructs one information, and in the sub-code data shown in FIG. 3(b) are recorded three (3) kinds of informations, into each one block thereof.

Figure 9A:
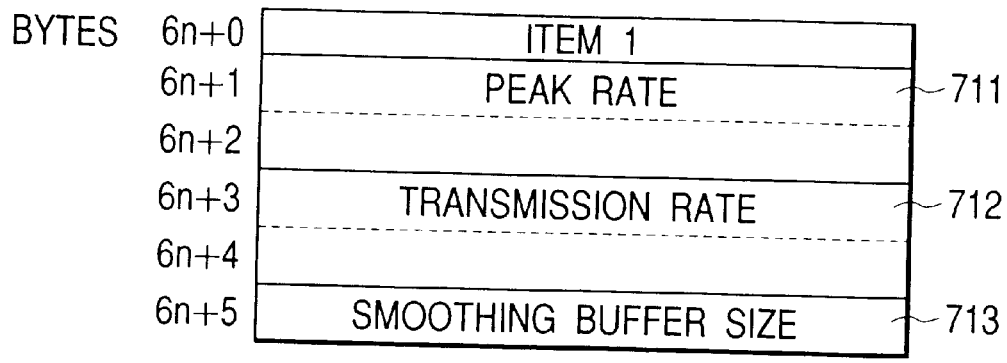
FIGS. 9(a) through (c) show the constructions when record data is recorded in the additional information 32 and the sub-code data 22.
Figure 9B:
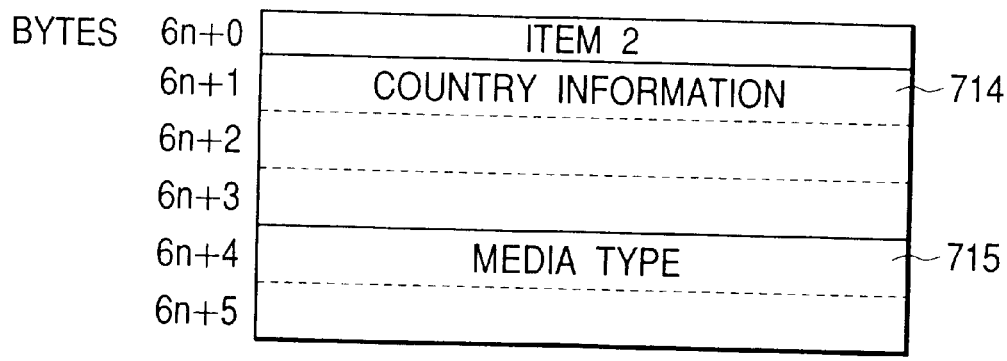
Figure 9C:
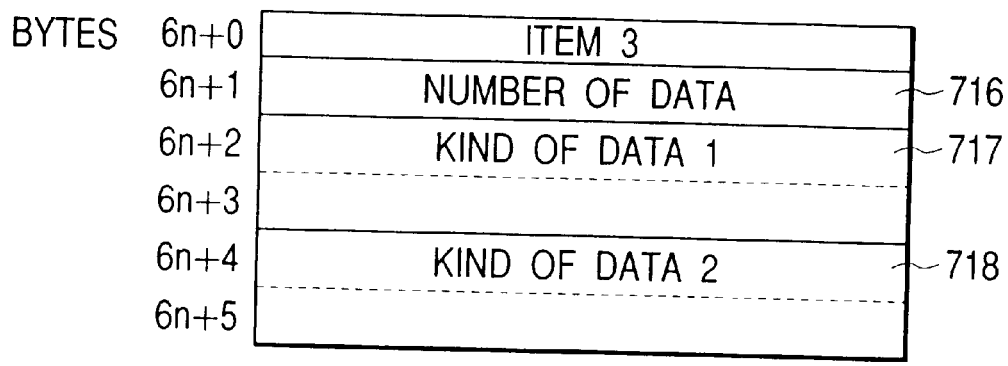

FIG. 9 shows an example of the construction in a case where the information of the record data is recorded into the additional information 32 and the sub-cord data 22. Here, the information is recorded with three (3) kinds of items. A reference numeral 711 indicates a peak rate being indicative of the minimum distance between the continuing packets, 712 a transmission rate of the digital signal, and 713 a smoothing buffer size when transmitting the digital signal. When the digital signal is smoothed by the smoothing buffer, the size of the buffer and the smoothed transmission rate are recorded therein. If not so, the smoothing buffer is made indefinite, and it is sufficient to memorize only the transmission rate therein. Further, in a case where the transmission rate is variable, the maximum transmission rate may be memorized therein. The peak rate 711 and the transmission rate 712 are in values by a unit of 1 kbits/sec, for examples while the smoothing buffer size 713 in value by unit of 64 bits, for example, and it may be made indefinite (unknown) when all of them are 1, for each. A reference numeral 714 indicates a country information of the recording data. For example, it is "100 1010 0101 0000 0100 1110" indicative of "JPN", when being Japan. A reference numeral 715 is a media type indicative of an origin of production of the record data. For example, it is "0100 0010 0101 0011" indicative of "BS" when being the BS broadcast, "0100 0011 0101 0011" indicative of "CS" when being the CS broadcast, and "0100 0101 0100 1110" indicative of "EN" (Encode) when it is data which is encoded by the encoder in the recording/reproducing apparatus. A reference numeral 716 indicates a number of the data to be recorded. Ordinarily, only one data is recorded, however when recording a plurality of data multiplexed, the number thereof is recorded here. Reference numerals 717 and 718 are indicative of the kinds of the data. For example, in "data kind 1" 717 is indicative of whether the data is the video (i.e., video & audio) or audio or data other than those two, etc., and in "data kind 2" 718 of the detailed kinds thereof. For example, in the case of the video, there are recorded a method of compression, a resolution (i.e., HD or SD, etc.), and in the case of the audio the method for compression thereof. Further, if the data is in plural, it is possible to record those mentioned above for each of them.

Those information can be produced in the recording/reproducing controller 105 and are recorded when they are encoded in the encoder 108 of the recording/reproducing apparatus shown in FIG. 1, while they can be produced from the information in the data inputted, when being inputted from the digital input/output terminal 116, or from the information transmitted separate from the data. When transmitting the information separate from the data, a request may be sent to an equipment of the sender before starting or during the recording, thereby to obtain the information of that equipment. When no transmission rate can be detected from the information in the data or from the information transmitted, or when it is indefinite, the maximum recording rate may be recorded, in the mode recorded as the transmission rate 712.

Also, when reproducing, this information can be transmitted to the other equipment from the digital input/output terminal 116. The transmission of this information is conducted when it is requested from the other equipment or when the information attached to the reproduced signal is changed. In this time, the maximum recording rate in the recording mode can be transmitted when no transmission rate is recorded or when it is indefinite.

By recording the information relating to the peak rate 711, the transmission rate 712, the smoothing buffer size 713, etc., it is possible to use them for deciding the recording mode when recording the reproduced signal by the other equipment. Namely, when being different in the maximum recording rate of the recording modes, by transmitting those information, the other equipment receiving the signal can decide in which mode it should record it, or can record it. Also, by using them for deciding on how much degree of the band area should be kept in a transmission path when outputting the data from the digital input/output terminal 116, it is possible to use the transmission path with high efficiency.

By recording the information relating to the original of the production, such as the country information 714 and the media type, etc., and also by displaying it/them, it is possible for a user to recognize the recording contents thereof. Further, it/they can be used for deciding the sender of the reproduction signal. For example, when a plurality kinds of digital broadcasting receivers are connected to the digital input/output terminal 116, it is possible to decide on the kind of the digital broadcast receiver which receives the record data, by means of that information, or when reproducing, it is possible to decode the reproduced data by transmitting it to that digital broadcasting receiver,.

By recording the information relating to the kinds of the digital signals, such as the number of data 716 and the data kinds 717 and 718, etc., it is possible to decide whether the setting of the decoder can be made or not for the data when decoding it, or whether the decoder can decode the data or not.

Figure 10:
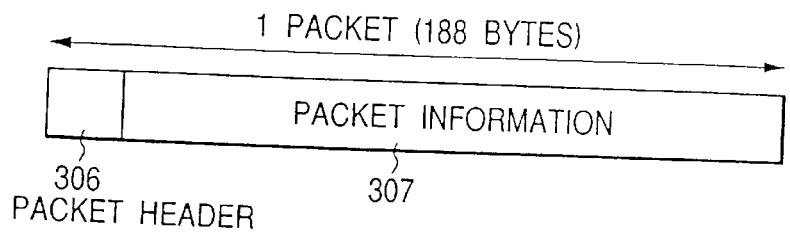
FIG. 10 shows the construction of a packet of the digital signal.

FIG. 10 shows the construction of the packet of the digital signal. One packet is formed or constructed in a fixed length, 188 bytes for example, and it comprises a packet header 306 of 4 bytes and a packet information 307 of 184 bytes. The digital signal is disposed in the area of the packet information 307. Also the packet header 306 is formed from or constructed with the information, such as the kind of the packet information.

Figure 11:
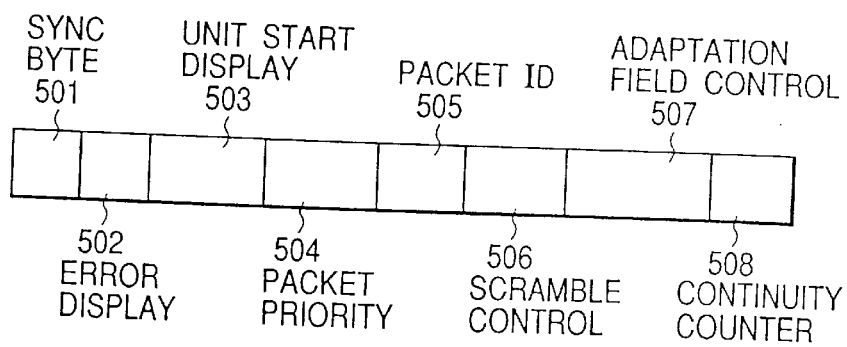
FIG. 11 shows the construction of a packet header shown in the FIG. 10.

FIG. 11 shows the construction of the packet header 306 shown in the FIG. 10. A reference numeral 501 indicates a synchronous byte, 502 a display for showing the presence of errors, 503 a unit start indicator for showing or indicating the start of the unit, 504 a packet priority for indicating an importance of the packet, 505 a packet ID for indicating the kind of the packet, 506 a scramble control for indicating the presence of a scramble, 507 indicates an adaptation field control for indicating the presence of the additional information and the presence of the packet information, and 508 a continuity counter for counting up by a unit the packet.

Figure 12:
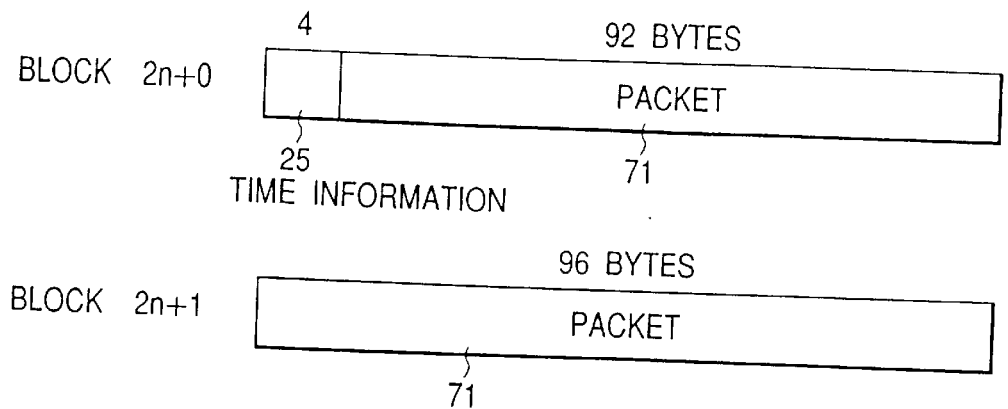
FIG. 12 shows the construction of blocks when recording the digital signal transmitted in the packet form of 188 bytes into the data recording area shown in the FIG. 2.

FIG. 12 shows an example of the block construction when recording the digital signal 71, being transmitted in the form of the packet of 188 bytes, into the data recording area 41 shown in the FIG. 2. In this instance, the time information of 4 bytes is added thereto to be 192 bytes in total, thereby to record one (1) packet in the two (2) blocks. The time information 25 is that of the time when the packet is transmitted. Namely, counting up the time when the packet (i.e., a head of it) is transmitted or a distance between the packets with a reference clock, the counted value is memorized together with the packet data, and then the distance between the packets is determined or setup upon the basis of that information when reproducing, thereby outputting the data in the form being equal to that when it was transmitted.

Next, explanation will be given on the control of the signals when recording/reproducing.

Figure 13:
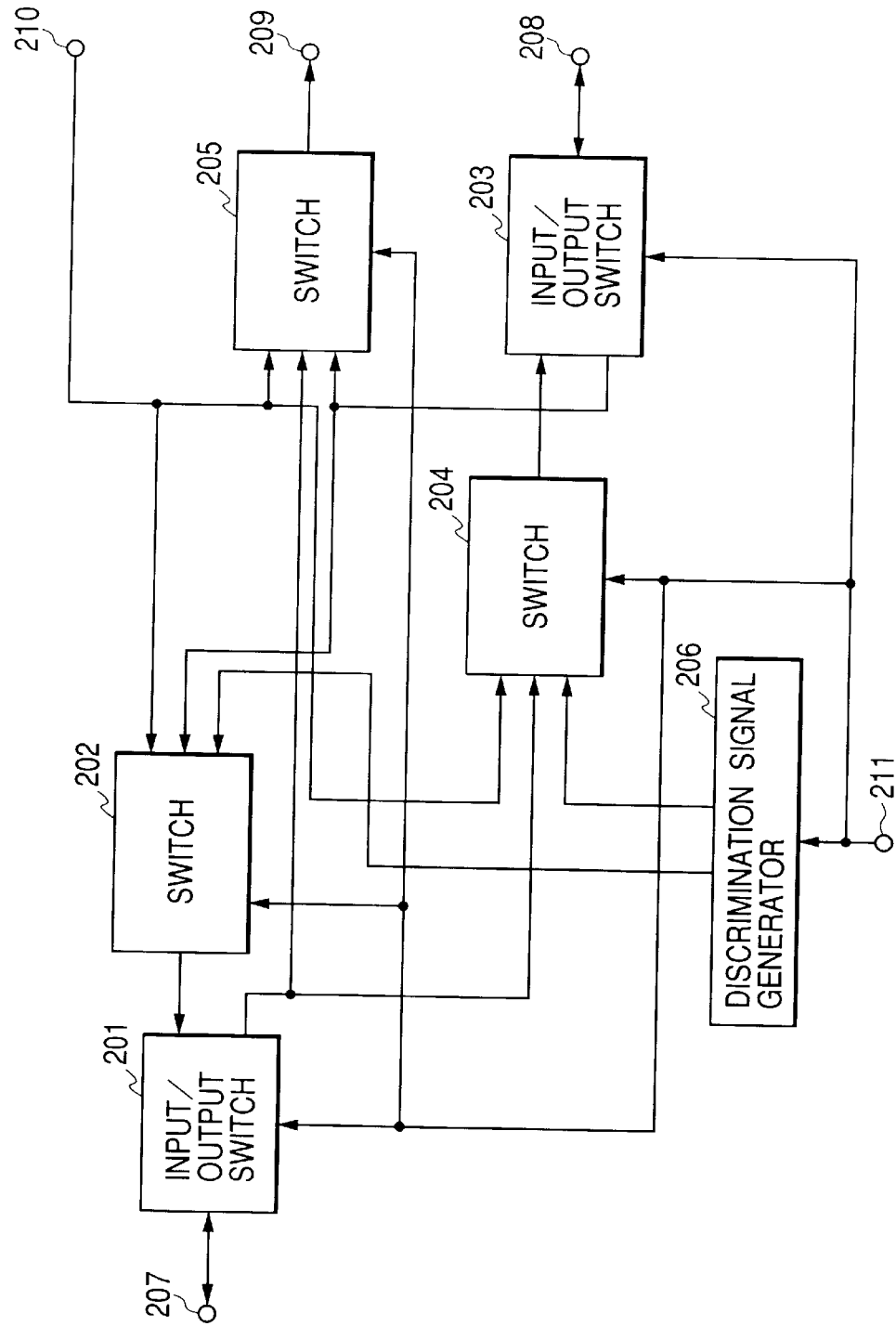
FIG. 13 shows the construction of an input/output controller 107 shown in the FIG. 1.

FIG. 13 shows the construction of the input/output controller 107 shown in the FIG. 1, in more detail.

A reference numerals 201 and 203 indicate input/output switches of the input/output terminals 207 and 208, 202, 203 and 205 switches, 206 a discriminating signal generator for discriminating discontinuity of the digital signal, 207 an input/output terminal for inputting/outputting of the signal into/from the recording/reproducing signal processor 106, 208 an input/output terminal for inputting/outputting the signal into/from the interface circuit 110 shown in the FIG. 1, 209 an output terminal for outputting of the signal to the decoder 109 shown in the FIG. 1, 210 an input terminal for inputting the signal from the encoder 108 shown in the FIG. 1, and 211 an input terminal for inputting the control signal from the recording/reproducing controller 105 shown in the FIG. 1.

A table 1 shows the controls in each of the modes of the input/output controller 107 shown in FIG. 1, and a table 2 the controls in each of the modes of the switches 111 and 113 shown in FIG. 1.

When inputting (i.e., recording) the digital signals, the input/output controller 107 brings the input/output switch 201 into a condition for outputting, while the input/output switch 203 into a condition for inputting, and it also controls the switches 202 and 205 so that the digital signal inputted from the interface circuit 110 is outputted to the recording/reproducing signal processor 106 and the decoder 109. Further, the signal being converted into the analog signal in the decoder 109 by controlling the switch 113 shown in FIG. 1, is outputted from the analog output terminal 114, thereby enabling to monitor the input signal.

When recording the digital signal input through re-encoding thereof, the input/output controller 107 brings the input/output switch 201 into a condition for outputting, while the input/output switch 203 into a condition for inputting, and it also controls the switches 202 and 205 so that the digital signal inputted from the interface circuit 110 is outputted to the decoder 109. And, the digital signal which is converted in the encoder 108 is outputted to the recording/reproducing signal processor 106.

TABLE 1

| Mode | Recording/Reproducing signal (207) | Interface Input/Output (208) | Decoder Output (209) |
|---|---|---|---|
| Digital Signal Input (Recording) | Digital Signal Output | Digital Signal Input | Digital Signal Output |
| Digital Signal Input (Re-encode Recording) | Analog Signal Output | Digital Signal Input | Digital Signal Output |
| Analog Signal Input (Recording) | Analog Signal Output | Analog Signal Output | Analog Signal Output |
| Digital Signal Reproduction | Reproduction Signal Input | Reproduction Signal Output | Reproduction Signal Output |

TABLE 1-continued

| Mode | Recording/Reproducing signal (207) | Interface Input/Output (208) | Decoder Output (209) |
|---|---|---|---|
| Analog Signal Reproduction | Analog Signal Output | Analog Signal Output | Analog Signal Output |

TABLE 2

| Mode | Encoder Input | Analog Output (114) |
|---|---|---|
| Digital Signal Input (Recording) | — | Decoder Output |
| Digital Signal Input (Re-encode Recording) | — | Decoder Output |
| Analog Signal Input (Recording) | Analog Input Signal | Analog Input Signal/Decoder Output |
| Digital Signal Reproduction | — | Decoder Output |
| Analog Signal Reproduction | Analog Reproduced Signal | Analog Reproduced Signal |

When inputting (i.e., recording) analog signal, the input/output controller 107 brings both the input/output switch 201 and the input/output switch 203 shown in the FIG. 13 into the condition for outputting, and at the same time, it controls the switches 202, 204 and 205 so that the digital signal being converted in the encoder 108 shown in the FIG. 1 is outputted to the recording/reproducing signal processor 106, the interface circuit 110 and the decoder 109. Also, the switch 111 shown in the FIG. 1 is set so that it select the analog signal input. From this, it is possible to convert the analog signal into the digital signal, so as to output it from the digital input/output terminal 116. Further, it is possible to convert it into the analog signal in the decoder 109, so as to output it through the switch 113 at the analog output terminal 114. Thereby, it is possible to make the confirmation of the digital signal being converted in the encoder 108, as well as the comparison of the signals being outputted, by changing over the output of the decoder 109 and the analog signal inputted from the analog input terminal 115 into the switch 113. However, when recording the analog signal, the recording is conducted by the analog signal recording/reproducing circuit 112, while when recording the digital signal, by the recording/reproducing signal processor 106.

It is sufficient that the switching or selection between the digital signal input and the analog signal input can be performed by the key 4, however it also may be performed by means of a control command inputted from the input/output terminal 116. Further, with provision of a detection means for detecting the presence of the signal input(s) in the interface circuit 110 or in the input terminal 115, it is possible to obtain an automatic switching or selection thereof, by detecting the presence of the signal input(s).

When inputting (i.e., recording) the digital signal, the input/output controller 107 brings the input/output switch 201 into the condition for outputting, while the input/output switch 203 into the condition for inputting, and it also controls the switches 202 and 205 so that the digital signal being inputted from the interface circuit 110 shown in the FIG. 1 is outputted into the recording/reproducing signal processor 106, as well as into the decoder 109. Further, the signal being converted into the analog signal in the decoder 109 by controlling the switch 113 shown in FIG. 1, is outputted from the analog output terminal 114, thereby enabling to monitor the input signal.

When reproducing the digital signal, the input/output controller 107 brings the input/output switch 203 shown in the FIG. 13 into the condition for outputting, and it also controls the switch 204 so that the digital reproduced signal being outputted from the recording/reproducing signal processor 106 shown in the FIG. 1 is outputted into the interface circuit 110. Further, it controls the switch 113 shown in the FIG. 1 so that the signal which is converted into the analog signal in the decoder 109 is outputted from the analog output terminal 114, thereby enabling to output the signal reproduced in digital from both the digital input/output terminal 116 and the analog output terminal at the same time.

When reproducing the analog signal, the input/output controller 107 brings the input/output switch 201 shown in the FIG. 13 into the condition for inputting, while the input/output switch 203 into the condition for outputting, and it also controls the switches 204 and 205 so that the digital signal being converted in the encoder 108 shown in the FIG. 1 is outputted to the interface circuit 110. Also, the switches 111 and 113 are so set that they select the output of the analog signal recording/reproducing circuit 112. Thereby, it is possible to output the signal which is reproduced in analog from both the digital input/output terminal 116 and the analog output terminal 114 at the same time.

In the discrimination signal generator 206 shown in the FIG. 13, the discrimination signal is produced or generated for discriminating the discontinuity of the digital signal. The discrimination signal is formed or constructed with a first packet attached with a flag being indicative of a fact of being discontinuous and a second packet attached with a flag indicative of the condition of the discontinuity, assuming that the packet ID5050 is a specific value, for example. When this signal is detected in the decoding within the decoder, it is possible to prevent from malfunction when the signal is in the discontinuity, as well as from disturbance of the decoded signals, by performing the processes, such as re-setting of the recorder circuit or the like. The discrimination signal generated by the discrimination signal generator 206 is outputted to the recording/reproducing signal processor 106 and also to the interface circuit 110 by controlling the switches 202 and 203, thereby enabling the addition of the discrimination signal to the record signal, as well as the outputting of the discrimination signal to the interface output.

A table 3 below shows the output controls in each of the operating modes of the discrimination signal.

TABLE 3

| Mode | Record Signal (207) | Interface Output (208) |
|---|---|---|
| Signal Switching (Stopping Condition) | — | Discrimination Signal Output |
| Signal switching (Recording Condition) | Discrimination Signal Output | Discrimination Signal Output |
| Digital Signal Recording Start/End | Discrimination Signal Output | — |
| Digital Signal Reproducing Start/End | — | Discrimination Signal output |
| Analog Signal Reproducing Start/End | — | Discrimination Signal Output |

When performing the switching or selection of the input signal, for example when changing over the digital signal and the analog signal, or when re-setting the encoder 108 accompanying the switching of the analog signal, the discrimination signal is outputted to the interface output. Of course, it is not outputted when being in the condition of inputting the digital signal. Further, when the switching of the input is conducted during the recording of the digital signal, the discrimination signal is added also to the record signal.

When starting or ending (or, stopping) the recording for the digital signal, the discrimination signal is added to the record signal. Also, when starting or ending (or, stopping) of reproducing for the digital signal, the discrimination signal is also added to the interface output. When reproducing the analog signal, it is similar to the case when switching the input signal.

Figure 14:
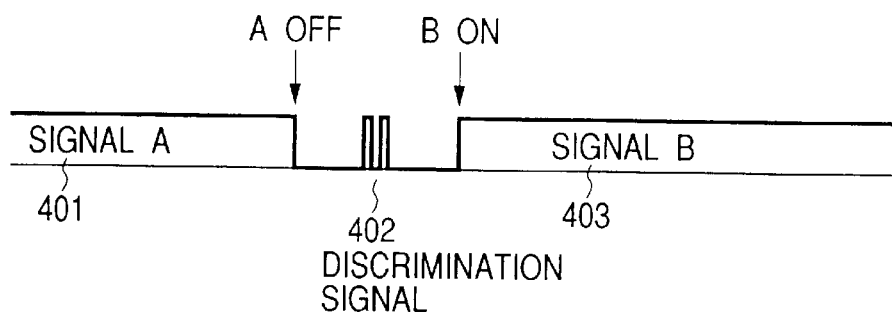
FIG. 14 shows output timing of a discrimination signal when an input signal is switched.

FIG. 14 shows timings of outputting the discrimination signal in the case when switching the input signal. When changing from a signal A to a signal B, first the signal A is stopped, and then the discrimination signal 402 is outputted a predetermined or certain time period after. And, further after a certain time period therefrom, the signal B starts to be outputted.

Figure 15:
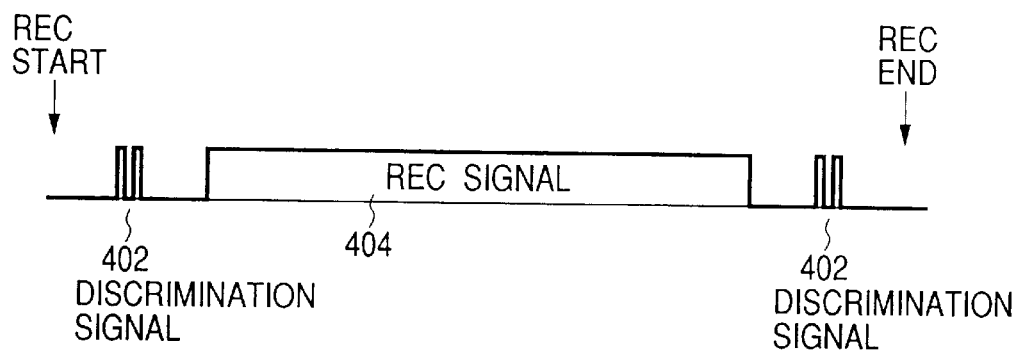
FIG. 15 shows output timing of the discrimination signal when recording the digital signal.

FIG. 15 also shows timings of outputting the discrimination signal but in the case when recording the digital signal. After a certain time period from the beginning of recording, the discrimination signal 402 is outputted. And, further after a certain time period therefrom, the record signal 404 to be recorded starts to be outputted. After completion of the recording, first the output of the signal to be recorded is stopped, and after a certain time period therefrom, the discrimination signal 402 is outputted. And, further after a certain time period thereafter, the recording is ended or completed.

Figure 16:
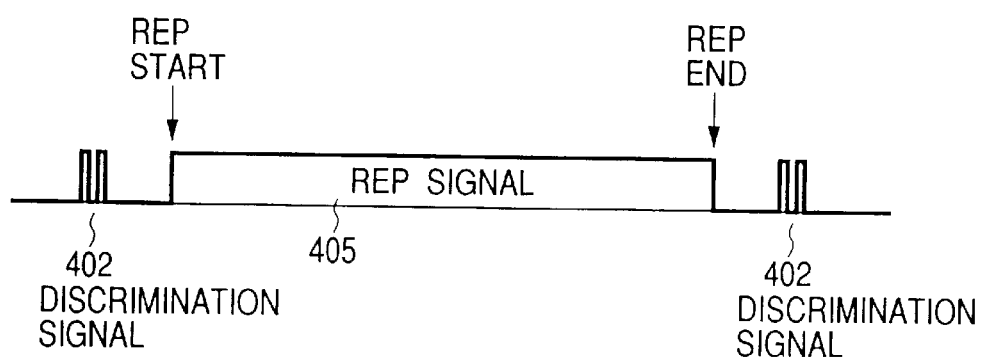
FIG. 16 shows output timing of the discrimination signal when reproducing the digital signal.

FIG. 16 further shows timing of outputting the discrimination signal in the case when reproducing the digital signal Fist, the discrimination signal 402 is outputted, and after a certain time period, the reproduced signal 405 begins to be outputted. When completing the reproduction, first the outputting of the reproduced signal is stepped, and after a certain time period therefrom, the discrimination signal 402 is outputted.

In this manner, by selectively conducting the addition of the discrimination signal to the record signal or to the output into the interface output, depending on the respective operation modes thereof, since the discrimination signal is outputted at every timing of switching, such as when the apparatus is changed in the operation mode or in the input, and also since the discrimination signal recorded on the magnetic tape is outputted every time when reproducing the signal being discontinuous in the recording, therefore the discrimination signal is inserted necessarily whenever the signal is in the discontinuity.

Figure 17:
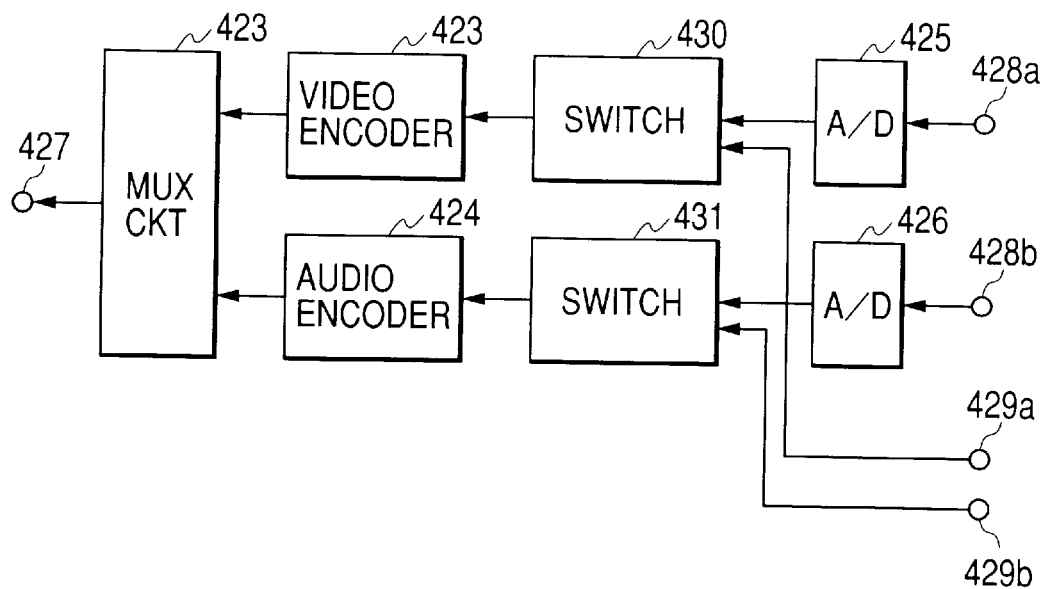
FIG. 17 shows the construction of an encoder 108 shown in the FIG. 1.

FIG. 17 shows an example of the construction of the encoder 108 shown in FIG. 1. A reference numeral 421 indicates a MUX circuit, 423 a video encoder, 424 an audio encoder, 425 and 426 A/D converters, 430 and 431 switches, 428a an analog video signal input terminal, 428b an analog audio signal input terminal, 429a and 429b input terminals of the decoded signals from the decoder 109 shown in the FIG. 1, and 427 a digital signal output terminal. However, in the FIG. 1, the analog video and audio signals are indicated as one signal.

The analog video and the analog audio signals, which are inputted from the input terminals 428a and 428b, are converted into the digital signals by the A/D converters 425 and 426, respectively, and are inputted into the video encoder 423 and the audio encoder 424 through the respective switches 430 and 431, thereby to be encoded into the digital signals being compressed. Also, when re-encoding the digital signal to be recorded, the decoded signals being inputted from the input terminals 429a and 429b are inputted into the video encoder 423 and the audio encoder 424 through the respective switches 430 and 431. Those signals encoded are inputted into the MUX circuit 421. In this MUX circuit 421, the compressed digital video and audio signals are formed into the form of the packet shown in the FIG. 10. In this instance, to the compressed digital video and audio signals are assigned the packet IDs being different to each other in the value thereof. Further, there are generated additional information packets, describing on which value is assigned to each of the packet IDs. Then, the video signal packet, the audio signal packet and the additional information packet are time-sharing multiplexed to be outputted from the output terminal 427. However, other than this, the information relating pictures to be recorded and/or the closed caption information attached to the analog video signal, etc., may be multiplexed in addition thereto. In a case of re-encoding the digital signal to be recorded, the information, such as program information attached to the digital signal, is detected when recording the digital signal, and then that information is added to the signal which is re-encoded in the MUX circuit 421, thereby enabling to reserve the additional information.

The encode rates in the video encoder 423 and the audio encoder 424 can be changed or altered. For example, if the encode rate is set corresponding to the maximum recording rate being recordable in that recording mode, depending upon the recording mode being set by the recording/reproducing controller 105, it is possible to achieve the most suitable encoding in any one of the modes.

Figure 18:
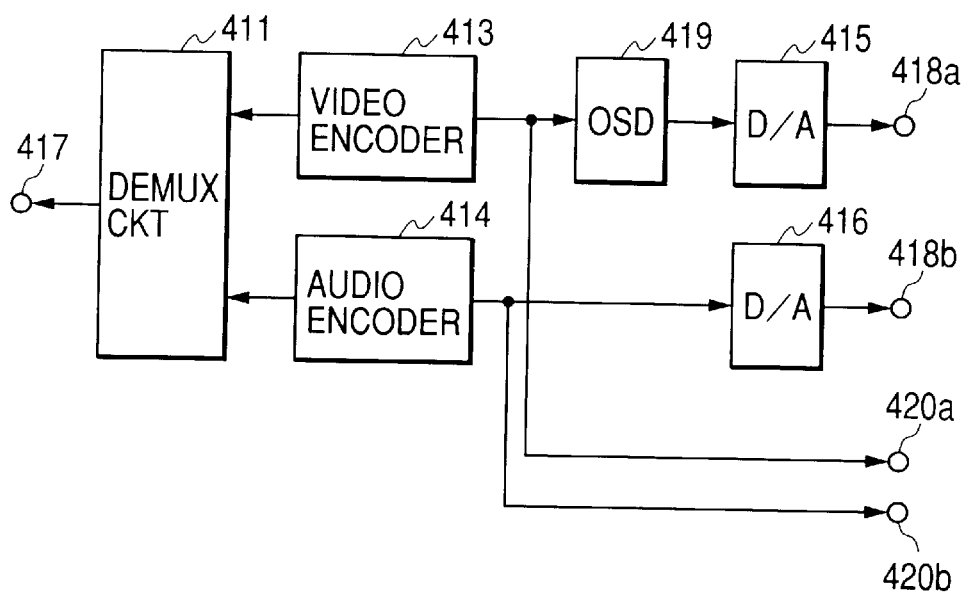
FIG. 18 shows the construction of a decoder 109 shown in the FIG. 1.

FIG. 18 shows an example of the structure of the decoder 109 shown in the FIG. 1. A reference numeral 411 indicates a DEMUX circuit, 413 a video decoder, 414 an audio decoder, 415 and 416 D/A converters, 417 a digital signal input terminal, 418a an analog video signal output terminal, 418b an analog audio signal output terminal, 419 an OSD circuit for multiplexing the information, such as the menu, etc., onto the video signal, and 420a and 420b output terminals of the decoded signal to the encoder 108. However, in the FIG. 1, the video and audio signals are indicated as one signal.

The digital signal inputted from the input terminal 417, in the DEMUX circuit 411, is acknowledged with the packet IDs of the video signal packet and the audio signal packet thereof, by means of the multiplexed additional information packet, and is divided into the compressed digital video and audio signals, thereby to be outputted to the video decoder 413 and the audio decoder 414, respectively. Then, after being decoded, they are converted into the analog signals in the D/A converters 415 and 416 to be outputted at the output terminals 418a and 418b.

When recording the digital signal by re-encoding thereof, the decoded signals outputted from the output terminals 420a and 420b are inputted into the input terminals of the encoder 108 shown in the FIG. 1, i.e., 429a and 429b in the FIG. 17, so as to be re-encoded therein. However, the signals are deteriorated in some degree, it may be possible to input the analog signals being outputted at the output terminals 418a and 418b, so as to be re-encoded therefor.

Figure 19:
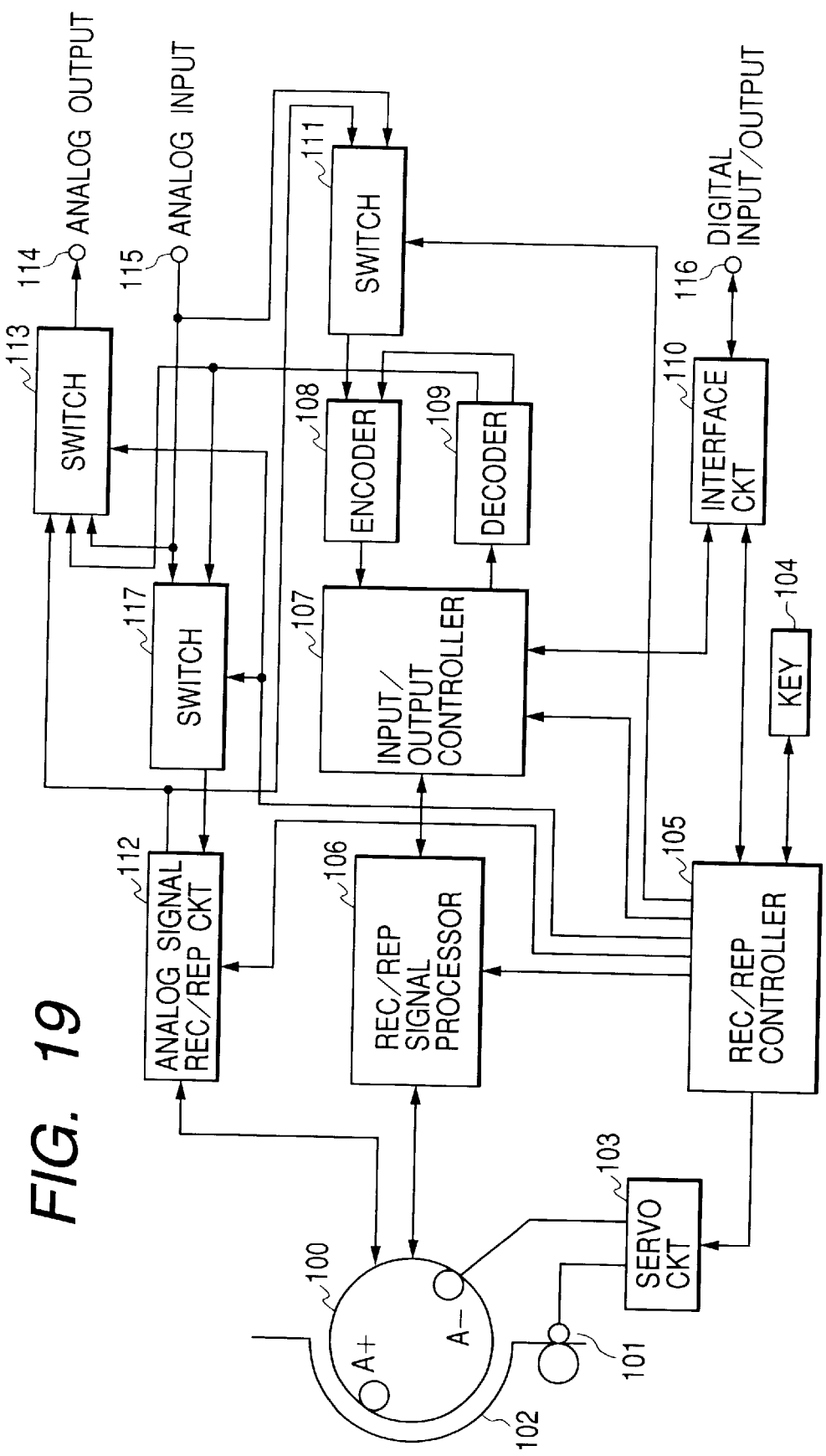
FIG. 19 is a block diagram of showing a recording and reproducing apparatus according to another embodiment of the present invention.

FIG. 19 shows an example of another structure of the recording/reproducing apparatus according to the present invention. In the FIG. 19, with provision of a switch 117, the analog signal, being obtained by decoding the digital signal inputted from the digital input/output terminal 116 in the decoder 109, is inputted into the analog signal recording/reproducing circuit 112, thereby enabling to perform the analog recording. Whether the digital signal should be recorded in digital or in analog otherwise can be set by the key 104, however it may be set automatically, by deciding or judging on the recording medium (i.e., the magnetic tape) under use, i.e., deciding to be the digital recording when the magnetic tape is the one corresponding to the digital recording, or otherwise to be the analog recording. Further, it may also possible that it is changed by means of the key 104 after being set automatically.

In this manner, it is possible to record the digital signal in analog, which is inputted from the interface circuit 110.

Figure 20:
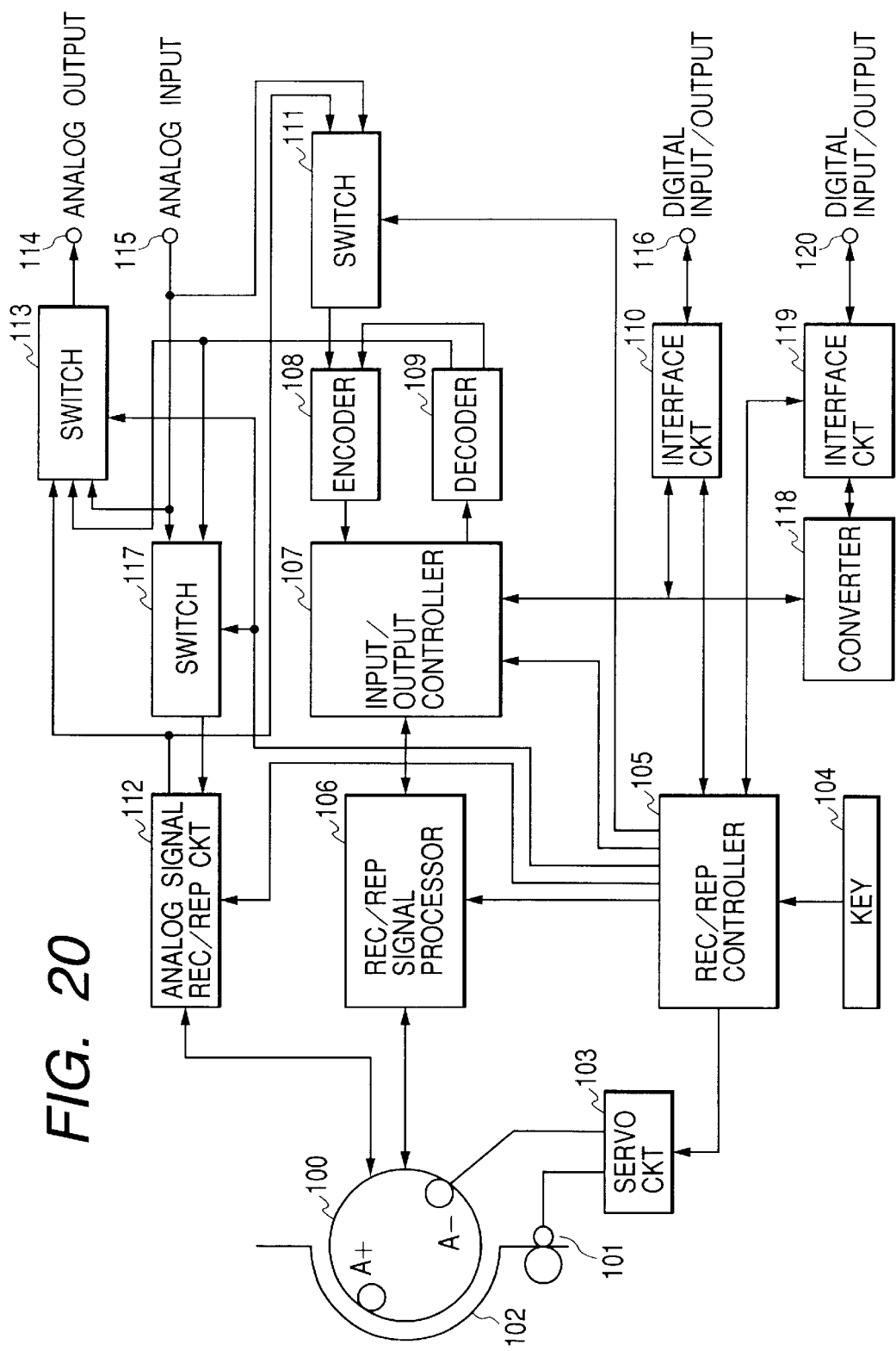
FIG. 20 shows the construction where a second interface circuit 119 and a digital signal converter 118 are provided in the recording and reproducing apparatus.

FIG. 20 shows an example of the construction, wherein a second interface circuit 119 and a digital information converter 118 are provided further, in the recording/reproducing apparatus according to the present invention. In the FIG. 20, with the provision of the converter 118, it is possible to convert the digital signal of other format which is inputted from the input/output terminal 116, thereby to be record or outputted.

As that other format, there is already known a signal which is described in FIG. 2 of Japanese Patent Laying-Open No. Hei 10-79168 (1998), for example. With such the signal, it differs in the format of the packet and the format of the compression from the signal shown in the FIG. 10. Accordingly, with provision of the second interface circuit 119 which can transmit the packet of that format, as well as the converter 118 which can convert the formats of the packet and in the compression, it is possible to convert the digital signal of the other format into the format shown in the FIG. 10, thereby to be recorded or outputted form the input/output terminal 116. Further, it is also possible to convert the signal being reproduced once into a digital signal of other format, so as to be outputted.

Figure 21:
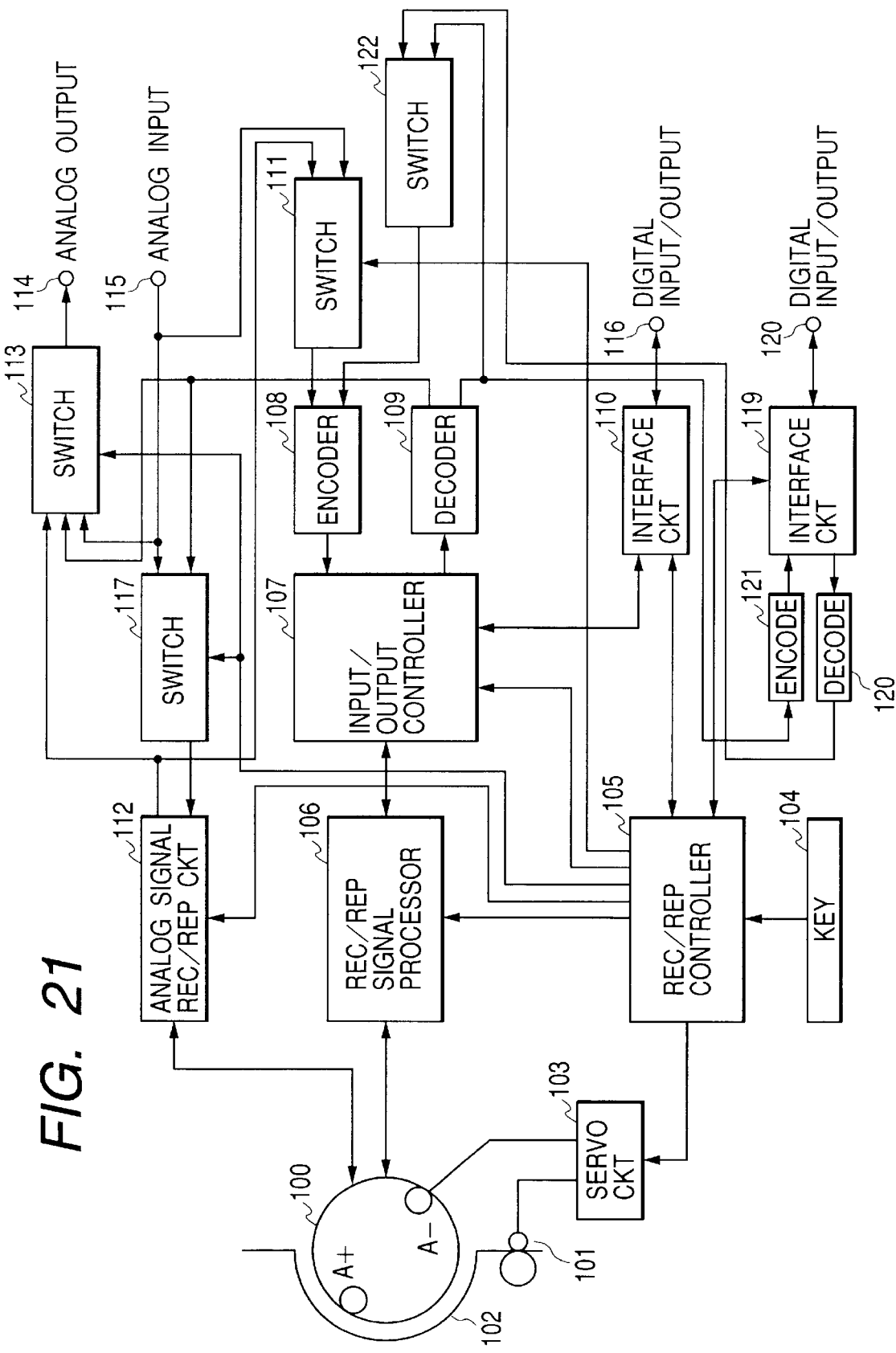
FIG. 21 shows the construction where a second interface circuit 119, a second decoder 120, a second encoder 121 and a switch 112 are provided in the recording and reproducing apparatus.

FIG. 21 shows an example of the construction, wherein further a second interface circuit 119, second decoders 120 and 121, and the switches 122 are provided, in the recording/reproducing apparatus, according to the present invention. The second decoders 120 and 121 are for conducting the decoding and encoding of the digital signal of the other format, as is described in the FIG. 2 of Japanese Patent Laying-Open No. Hei 10-79168 (1998). The digital signal inputted from the input/output terminal 116 is inputted into the decoder 120 through the interface circuit 119. And, after being decoded in the decoder 120, it is inputted into the encoder 108 through the switch 122, and is encoded into the signal shown in the FIG. 10 therein. In the encoder 108, it is enough that the decoded signal is directly inputted into the video encoder 423 or the audio encoder 434 so as to be encoded. Of course, it may be inputted into the encoder 108 after being converted into the analog signal once. Also, the signal decoded in the decoder 109 is encoded into the signal of the format shown in the FIG. 2 of Japanese Patent Laying-open No. Hei 10-79168 (1998), and the is outputted from the input/output terminal 116 through the interface circuit 119. In the decoder 119, it is enough that the output of the video decoder 413 and/or the audio decoder 414 shown in FIG. 18 are/is inputted into the encoder 121, directly. Of course, it may be inputted into the decoder 109 to be decoded therein, after being converted into the analog signal once.

Therefore, it is possible to convert the digital signal in the other format such as shown in the FIG. 2 of Japanese Patent Laying-Open No. Hei 10-79168 (1998), being different from the digital signal being defined by the recording method or system recorded on the recording medium, into the format of the digital signal which is defined by the recording method or system on that recording medium shown in the FIG. 10, so as to be recorded or to be outputted from the input/output terminal 116. Further, also it is possible to convert not only the reproduced signal, but also the analog signal inputted from the analog input terminal 115 or the digital signal inputted from the digital input/output terminal 116, into the digital signal of the other format so as to be outputted.

However, the input/output terminals 116 and 118 may be used in common, and the interface circuits 110 and 119 may be replaced commonly by an interface circuit being operative under a plurality of methods or systems.

Figure 22:
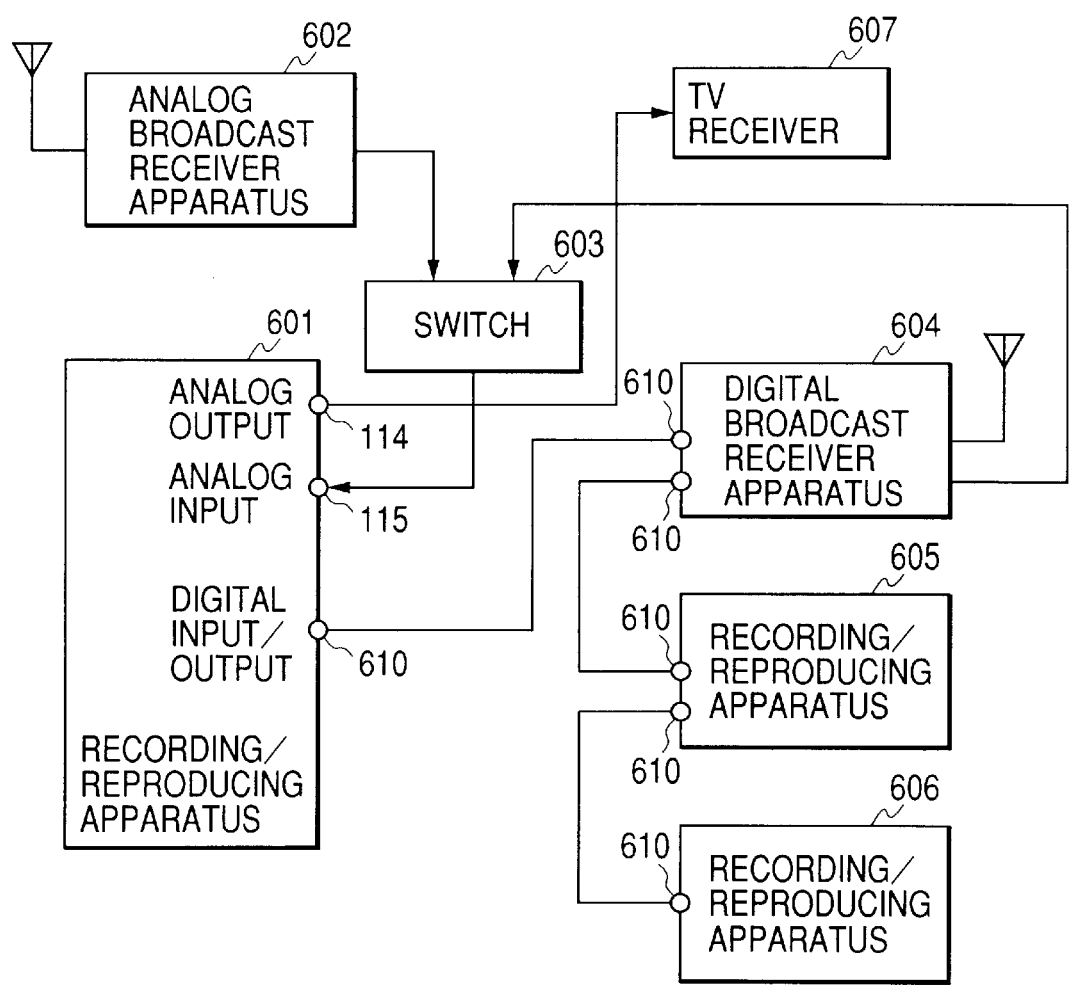
FIG. 22 is a view of showing an example of connection of the recording and reproducing apparatus with other equipments.

FIG. 22 shows an example of the connection, in which the recording/reproducing apparatus of the present invention is connected with other various equipments. A reference numeral 601 indicates the recording/reproducing apparatus of the present invention, 602 an analog broadcast receiver apparatus, 603 a switch, 604 a digital broadcast receiver apparatus, 605 an apparatus being same to the recording/reproducing apparatus of the present invention, 606 a recording/reproducing apparatus of the other format, and 607 a TV receiver. However, the input/output terminal 610 of the recording/reproducing apparatus 601 shares the function with the input/output terminal 116 of the recording/reproducing apparatus shown in the FIG. 20 or FIG. 21, in common. Namely, it is possible to input and output the digital signals of the plurality of formats. Further, each of the digital broadcast receiver apparatus 604 and the recording/reproducing apparatus 605 has two input/output terminals 610, and each the two terminals achieves not only the function of inputting/outputting the digital signals, but also of passing through the digital signal from one side to the other. Therefore, the digital signal can be transmitted between an arbitrary equipments. Of course, the terminals more than two may be provided, or otherwise the plural terminals may be provided on the other equipment(s), such as the recording/reproducing apparatus 601, for example. Or, the connections may be made in the other order, as far as all the necessary equipments are connected therewith. Further, not shown in the figure, it is also possible to connect a second digital broadcast receiver or a TV receiver which installs the decoder or a digital broadcast receiving apparatus therein.

When recording the digital broadcast signal received by the digital broadcast receiver 604, the digital broadcast signal outputted from the input/output terminal 610 of the digital broadcast receiver 604 is inputted from the input/output terminal 610 of the recording/reproducing apparatus 601 to record. Also, when reproducing, the reproduced signal may be outputted from the input/output terminal 610 of the recording/reproducing apparatus 601 to the input/output terminal 610 of the digital broadcast receiver 604, thereby decoding it in the decoder of the digital broadcast receiver 604 so as to output it in the form of analog signal.

When recording the digital signal reproduced by the recording/reproducing apparatus 605 into the other recording/reproducing apparatus 601, the reproduced digital signal outputted from the input/output terminal 610 of the recording/reproducing apparatus 605 is inputted through the input/output terminal 610 of the digital broadcast receiver 604 into the input/output terminal 610 of the recording/reproducing apparatus 601, thereby to be recorded. When recording the reproduction signal reproduced by the recording/reproducing apparatus 601 in the other recording/reproducing apparatus 605, the reproduced digital signal outputted from the input/output terminal 610 of the recording/reproducing apparatus 601 is inputted through the input/output terminal 610 of the digital broadcast receiver 604 into the input/output terminal 610 of the other recording/reproducing apparatus 605, thereby to be recorded.

When recording the digital signal reproduced by the further other recording/reproducing apparatus 606 into the recording/reproducing apparatus 601, the reproduced digital signal outputted from the input/output terminals 610 of the other recording/reproducing apparatus 605 is inputted through the other recording/reproducing apparatus 605 and the digital broadcast receiver 604 into the input/output terminal 610 of the recording/reproducing apparatus 601, thereby to be recorded after being converted into the format of digital signal. Also, when recording the reproduction signal which is reproduced in the recording/reproducing apparatus 601 by the further other recording/reproducing apparatus 606, the digital reproduction signal reproduced in the recording/reproducing apparatus 601 is outputted from the input/output terminal 610 after being converted in the format thereof. And, the digital signal outputted from the input/output terminal 610 of the digital recording/reproducing apparatus 601 is inputted through the input/output terminals 610 of the digital broadcast receiver 604 and the other recording/reproducing apparatus 605 into the input/output terminal 610 of the further other recording/reproducing apparatus 606.

The analog signals outputted from the analog broadcast receiver apparatus 602 and the digital broadcast receiver apparatus 604 are inputted to the input terminal 115 through the switch 603. Also, the analog signal outputted from the output terminal 114 is inputted into the TV receiver 607.

Therefore, it is possible to achieve the recording of the analog signal which is outputted from the broadcast receiver apparatus 602 or the digital broadcast receiver 604 and the outputting thereof to the TV receiver 607. However, the switch 603 and the analog broadcast receiver apparatus 602 may be installed within the recording/reproducing apparatus 601. Further, also the digital broadcast receiver apparatus 604 may be installed within the recording/reproducing apparatus 601.

According to the present invention, it is possible to output the signal, being reproduced in analog or inputted in analog, from the interface circuit as in the form of digital signal thereof. Further, it is possible to record the digital signal inputted from the interface circuit in the form of the analog signal thereof.

Also, according to the present invention, it is possible to convert the digital signal of the other format(s) being different from that of the digital signal which is defined by the recording method or system recorded on the recording medium, so as to be recorded thereon, or to output it from the other input/output terminal(s). Further, it is also possible to convert the reproduced signal into the digital signal of the other format so as to be outputted.

Furthermore, the digital signal inputted is re-encoded to be less than the maximum recordable value in the transmission rate thereof, thereby enabling to still record the digital signal having the transmission rate being higher than the maximum recordable transmission rate. Moreover, it is possible to re-encode it to be less in the transmission rate thereof, thereby to be record in the mode for enabling a long time period recording.

The invention may be embodied in other specific form without departing from the spirit or essential characteristics thereof. The present embodiment is therefore to be considered in all respects as illustrative and not restrictive, the scope of the invention being indicated by the appended claims rather than by the forgoing description and all changes which come within the meaning and range of equivalency of the claims are therefor to be embraced therein.

What is claimed is:

1. A recording and reproducing apparatus, comprising:
   a digital signal recording/reproducing apparatus for recording digital signal onto recording medium, or for reproducing digital signal from said recording medium;
   an interface circuit for inputting or outputting said digital signal;
   an encoder for converting analog signal into digital signal;
   a discrimination signal generator for generating a discrimination signal;
   a first switch for selecting one among the digital signal which is inputted from said interface circuit, the digital signal which is converted in said encoder and said discrimination signal which is outputted from said discrimination signal generator, so as to output to said digital signal recording/reproducing, when recording; and
   a second switch for selecting one among the digital signal which is outputted from said digital signal recording/reproducing circuit, the digital signal which is converted in said encoder and said discrimination signal which is outputted from said discrimination signal generator, so as to output to said interface circuit, when recording or reproducing.

2. A recording apparatus, comprising:
   an encoder for converting analog signal inputted into digital signal;
   a digital signal recording circuit for recording the digital signal which is converted in said encoder into recording medium; and
   a decoder for converting said digital signal into analog signal, wherein
      further the analog signal which is converted in said decoder is outputted, after said inputted analog signal is converted into the digital signal in said encoder;
   further comprising:
      a switch for outputting to by switching between said inputted analog signal and the analog signal which is converted in said decoder, wherein
         said inputted analog signal and said analog signal which is further converted in said decoder after being converted in said encoder from said inputted analog signal are outputted by switching therebetween.

3. A recording apparatus as defined in the claim 2, wherein said encoder converts the analog signal into compressed digital signal, and said decoder converts the compressed digital signal into the analog signal.

4. A recording apparatus as defined in the claim 2, wherein said analog signal is analog video and/or audio signal, and said digital signal is compressed digital video and/or audio signal.

5. A recording apparatus as defined in the claim 2, wherein said encoder is able to change a rate of the encoding thereof.

6. A recording apparatus as defined in the claim 5, wherein said encoder changes the rate of the encoding depending upon recording mode.

7. A recording apparatus as defined in the claim 2, wherein said decoder has function of multiplexing additional information, and outputs analog signal, being further converted and multiplexed with said additional information in said decoder after being converted into the digital signal from said inputted analog signal in said encoder.

\* \* \* \* \*